United States Patent [19]

Bechtold

[11] Patent Number: 4,827,668
[45] Date of Patent: May 9, 1989

[54] CHAIN OPERATOR FOR A WINDOW

[76] Inventor: Stephen K. Bechtold, 306 Ocean Ave., Northport, N.Y. 11768

[21] Appl. No.: 125,020

[22] Filed: Nov. 24, 1987

[51] Int. Cl.$^4$ ............................................. E05F 11/03
[52] U.S. Cl. ...................................... 49/325; 74/424.6
[58] Field of Search ................. 49/325, 324; 74/424.6, 74/606 R; 474/903, 902

[56] References Cited

U.S. PATENT DOCUMENTS

| | | | |
|---|---|---|---|
| 1,245,400 | 11/1917 | Tomlinson | 74/424.6 X |
| 4,014,136 | 3/1977 | Hemens et al. | 49/325 |
| 4,481,735 | 11/1984 | Jentoft et al. | 49/325 |
| 4,521,993 | 6/1985 | Tacheny et al. | 49/325 |

Primary Examiner—Philip C. Kannan
Attorney, Agent, or Firm—Hoffmann & Baron

[57] ABSTRACT

The present invention concerns a chain operator for a window which comprises a chain formed of a plurality of interconnected chain links and a casing having a spaced first and second chain exit openings. A chain guide track is disposed in the casing and extends between the first and second chain exit openings and is positioned to guide the chain between the chain exit openings. One end of the chain is affixed to a window and a drive sprocket is rotatably mounted in the casing. The drive sprocket has a plurality of sprocket teeth which lie along the planar surface of the drive sprocket and are engagable with the chain to drive the chain between the chain exit opening when the drive sprocket is rotated. A guide arrangement is positioned in the casing adjacent one of the chain exit openings and guides the chain links near the chain exit opening and maintains the chain links substantially in the plane of the planar surface of the drive sprocket, as the chain links move through the casing into engagement with the sprocket teeth. The guide arrangement thereby avoids jamming of sprocket teeth in the chain links and minimizes undesirable noise producing engagement of chain with the casing. Another feature of the present invention includes the use of stablizing rings disposed in position to engage and maintain the drive sprocket from substantial wobbling during rotation and thereby further preventing misalignment between the sprocket teeth and the chain links.

27 Claims, 2 Drawing Sheets

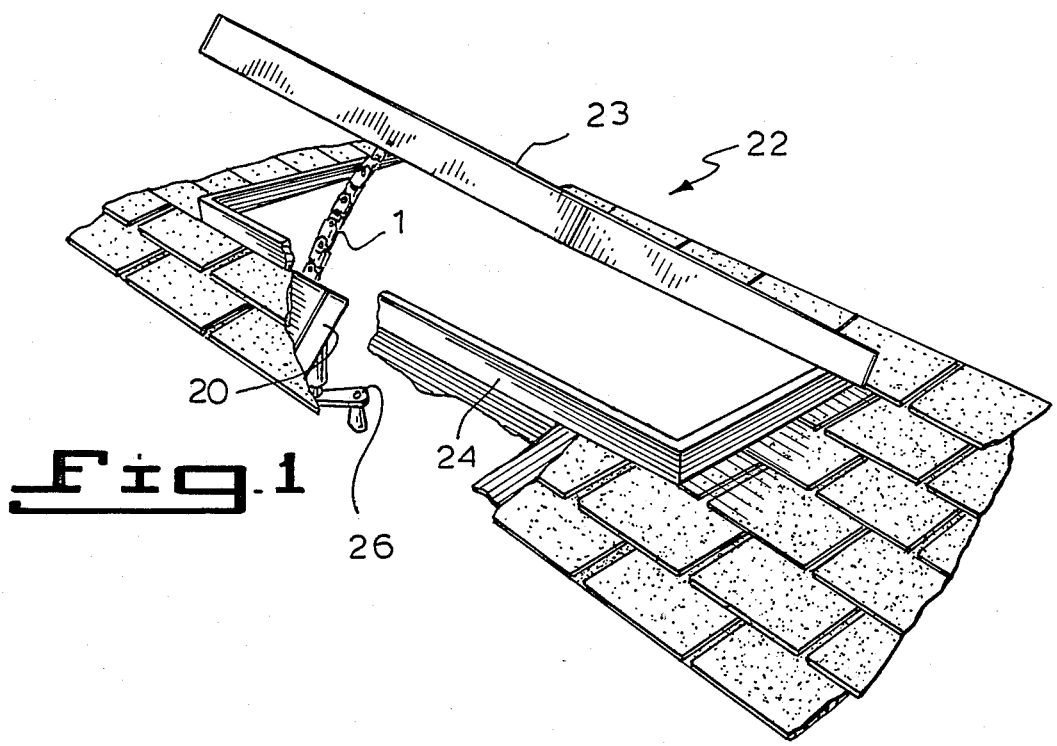
Fig.1
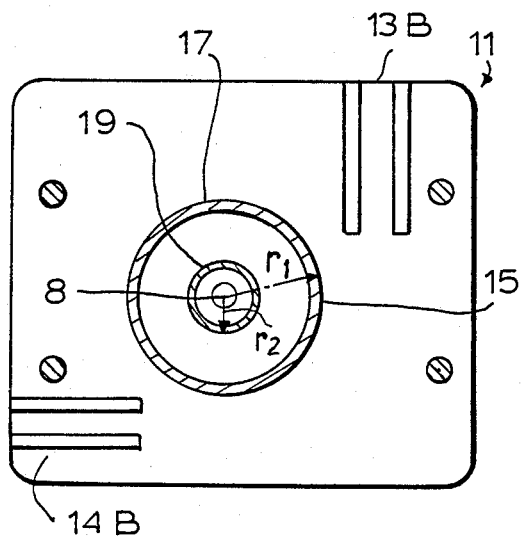
Fig.6
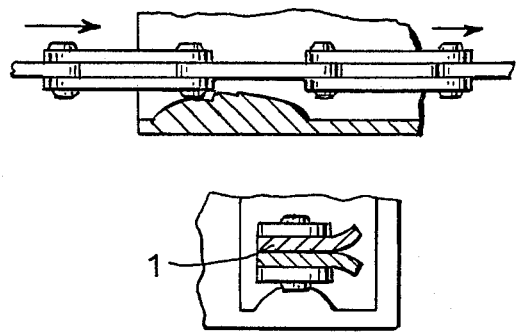
Fig.7A
(PRIOR ART)
Fig.7B
(PRIOR ART)

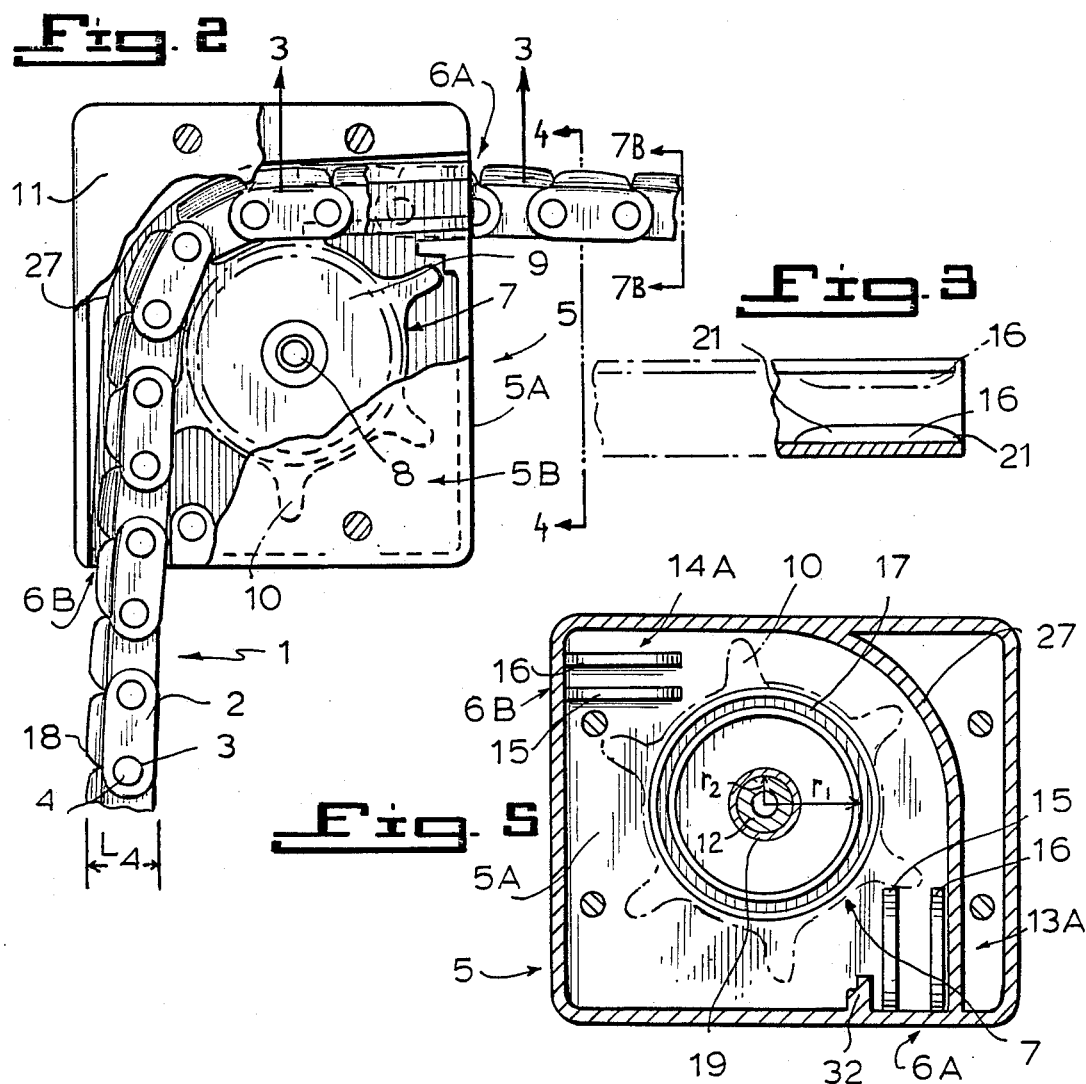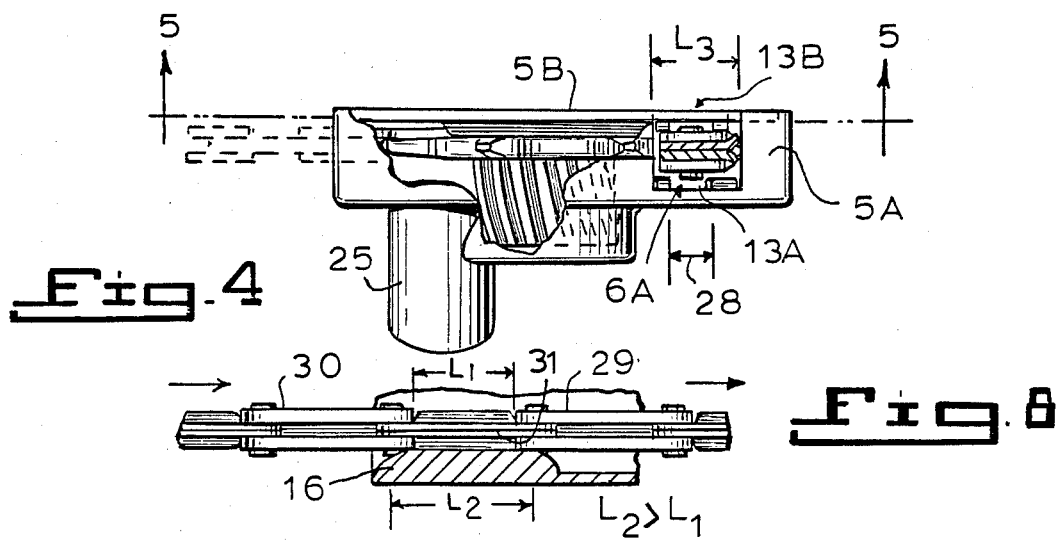

CHAIN OPERATOR FOR A WINDOW

FIELD OF THE INVENTION

The present invention relates to a new and improved chain operator for a window, such as a skylight window assembly, wherein a chain, which can assume a curved configuration while in storage within the casing of the chain operator, can assume a straight configuration and move outwardly from the the casing to open the swinging window.

BACKGROUND OF THE INVENTION

There are different types of chain operators for windows, wherein a length of chain may be stored within a casing for the operator, and rotation of a drive sprocket within the casing causes movement of the chain either into or out of the casing for positioning of a window connected to an exposed end of the chain.

Examples of sprocket driven chain operators for windows are disclosed in U.S. Pat. Nos. 4,521,993; 4,481,735 and 4,014,136.

In particular, U.S. Pat. No. 4,521,993 to Tacheny et al., discloses a chain operator for a skylight window which includes a casing having a chain storage area. The chain storage area includes a chain guide track therein having a curved portion extending to a chain exit from the casing. A drive sprocket is mounted within the casing and is engagable with the chain. Connected to the drive sprocket is a drive means such as a hand crank or motor which converts a power input into rotation of the drive sprocket. Also, the casing is fitted with a unitary liner, preferably made of plastic, which as a first part for rotatably mounting the drive sprocket and a second part lining the curved portion of the guide track opposite the drive sprocket.

As in U.S. Pat. No. 4,521,993, most chains for use with chain operators are constructed from a plurality of solid links and a plurality of U-shaped links, with the U-shaped links being positioned in end-to-end abutting relation and the solid links having a thickness to closely fit within the U-shaped links. The links are constructed to provide substantial rigidity for the chain when it is in its extended configuration. This substantial rigidity allows the chain to transmit force in its extended configuration, to the window for opening and closing thereof. It is customary for the links to have coacting shapes to facilitate movement of the chain between straight and curved configurations while maximizing the strength thereof. It is also customary to form rivets with large heads pivotally interconnecting the opposite ends of a solid link to a pair of U-shaped links for increased strength.

However, despite the incorporation of the aforementioned structural features into chain operators, the loads to which such window operators are normally subjected especially in skylight applications, have caused (1) the drive sprocket of the window operator to wobble causing the jamming of sprocket teeth into chain links and (2) the chain to slip with respect to the sprocket teeth, to produce chatter and clunk noises as the chain is moved through the window operator. Such undesired consequences and limitations of the prior art operators have resulted from a number of inadequacies in the structure thereof, including the mounting of the drive sprocket, the guide structure for the chain, and the construction of the chain itself.

The disclosure and chain operator U.S. Pat. No. 4,521,993 to Tacheny et al. does not address or consider the problem of drive sprockets tending to wobble due to loading, and the chain producing chatter and clunk noises due to slippage as the chain is moved through the window operator.

In the past, measures have been taken to reduce the chatter and clunk noises produced by the chain, due to slippage and misalignment of chain links with drive sprocket teeth. Referring to FIGS. 7A and 7B, a guide projection having a shape of a solid mound is illustrated. As illustrated in FIG. 7B in particular, the solid mound-like guide projection is formed on the inside of the chain operator housing near the chain exit opening adjacent the window to which the free end of the chain assembly is connected. The purpose of this guide projection is to maintain the chain assembly 1 in alignment with the drive sprocket of a chain operator, as the chain passes through the same.

It has been discovered however, that with this guide projection design, the rivet heads may at times dig into the guide projection as the chain comes into contact with the guide projection. Also, the edges of the link plates may at times, dig into the surfaces of the projection over a short distance, slip out of the grooves formed therein, and consequently produce an annoying scraping and chatter noise which tends to reduce the quality of the chain operator's performance.

Accordingly, it is a primary object of the present invention to provide a chain operator for a window which prevents the drive sprocket from wobbling and avoids the jamming of sprocket teeth into chain links while eliminating chatter, scraping and clunk noise associated therewith.

It is another object of the present invention to provide a chain operator which maintains the chain links substantially in the plane of the planar surface of the drive sprocket as to avoid jamming of the sprocket teeth in the chain links.

It is a further object of the present invention to provide a chain operator which prevents the chain from slipping with respect to the sprocket teeth thereby eliminating the production of chatter and clunk noises as the chain is moved through the window operator.

Other and features objects will be explained hereinafter, and will be more particularly delineated in the appended claims, and hereinafter other objects of the present invention will, in fact, be apparent to those skilled in the art to which the present invention pertains.

SUMMARY OF THE INVENTION

The present invention concerns a chain operator for a window which comprises a chain formed of a plurality of interconnected chain links, and a casing having a spaced first and second chain exit openings. A chain guide track is disposed in the casing and extends between the first and second chain exit openings and is positioned to guide the chain therebetween. One end of the chain is affixed to a window and a drive sprocket is rotatably mounted in the casing. The drive sprocket has a plurality of sprocket teeth which are engagable with the chain to drive the chain between the chain exit opening when the drive sprocket is rotated. An actuator is disposed on the casing, connected to the drive sprocket, and is positioned to be engaged and rotated as to operate the drive sprocket and drive the chain. Also, a guide arrangement is positioned in the casing adjacent one of the chain exit openings and includes at least one rivet head accommodation means for accommodating rivet heads. The rivet head accommodation means is disposed on one side of the chain, and in the preferred embodiment that head accommodation means is provided by first and second parallely disposed guide projections sufficiently spaced apart to provide a channel for the rivet heads to slide therewithin. Also, the ends of each guide projection are slightly rounded so that the chain links upon coming into contact with the ends of the guide projections, can slide thereover without substantial resistance and with minimal noise.

The chain exit opening adjacent the guide arrangement is provided with a narrow opening of dimensions slightly greater than the height of the chain link plates for purposes of guiding the chain links towards the guide arrangement so that the rivet heads are guided in the rivet head accommodating means. The length of the first and second guide projections is greater than the distance between the ends of two spaced links pivotally connected by an intermediate joining link. The guide arrangement is also provided with a planar guide shoulder disposed adjacent the chain exit opening nearest the drive sprocket, which in the preferred embodiment, is towards the window unit. The planar guide shoulder is also aligned with the boundary edges of the narrow chain exit opening and parallel with the guide projections. The narrow chain exit opening, the guide projections with the rivet head accommodation means, and the planar guide shoulder cooperate to guide the chain towards the guide arrangement so that the rivet heads are guided in the accommodation means. The narrow chain exit opening, guide projections with accommodation means, and planar guide shoulder also cooperate to maintain the chain links substantially in the plane of the planar surface of the drive sprocket as the chain length moves through the casing into engagement with the sprocket teeth thereby avoiding jamming of sprocket teeth into chain links, and also preventing the chain links from digging into the guide projections thereby eliminating noise produced therefrom. Also, such cooperation minimizes undesirable noise producing engagement of chain with portions of the casing.

In the preferred embodiment of the present invention, the drive sprocket has a center and a planar surface in the plane of which the plurality of sprocket teeth are disposed. Also, the casing comprises a housing for mounting the drive sprocket, and a housing cover plate mountable onto the back of the housing. The housing includes the spaced first and second chain exit openings, and is adapted to receive the actuator which can be either a manually operable crank mechanism or an electric motor driven unit. The guide arrangement comprises an upper guide arrangement disposed inside the housing adjacent one of the chain exit openings, and a lower guide arrangement disposed on the housing over plate. The upper and lower guide arrangements cooperate as to guide the chain links near the chain exit opening and to maintain the chain links substantially in the plane of the planar surface of the drive sprocket when the housing cover plates is positioned onto the housing and as the chain length moves through the casing into engagement with the sprocket teeth, to thereby avoid jamming of sprocket teeth into the chain links.

Another feature of the present invention is a stablizing means disposed in the casing in position to engage and maintain the drive sprocket from substantial wobbling during rotation and thereby preventing misalignment between the sprocket teeth and the chain links. The stabilizer means can be formed on the housing cover plate, or onto the drive sprocket itself. In the case where the stabilizer means is on the housing cover plate, it bears against the planar surface of the drive sprocket when the housing cover plate is positioned onto the casing. In the case where the stabilizer means is on the drive sprocket, the housing cover plate has a substantially planar surface in the area of engagement opposite the planar surface of the drive sprocket when the housing cover plate is positioned onto the housing, and the stabilizer means bears against the planar surface of the housing cover plate. In both cases, the stabilizer means serves to thereby prevent wobbling of the drive sprocket when engaged by the actuator.

In the preferred embodiment, the stabilizer means comprises a first ring-like projection integrally formed on the housing cover plate and is concentric with the center and bears against the planar surface of the drive sprocket at a radius from the center, when the housing cover plate is positioned onto the housing. Additionally, the stabilizer means can further comprise a second ring-like projection integrally formed with the housing cover plate and concentric with the center. As with the first ring-like projection, the second ring-like projection of a substantially smaller radius bears against the planar surface of the drive sprocket when the housing cover plate is positioned onto the housing. This second ring-like projection provides further stabilization to the drive sprocket when subjected to extremely high loads as can be expected when the chain operator hereof is used to open and close the swinging window units of a conventional skylight window assembly.

DESCRIPTION OF THE DRAWINGS

For a fuller understanding of the objects of the present invention, reference is made to the following detailed description of the preferred embodiment which is to be taken in connection with the accompanying drawings, wherein;

FIG. 1 is a perspective partially cut-away view of a skylight window assembly wherein the chain operator of the present invention is installed;

FIG. 2 is a partially broken away top plan view of the chain operator of the present invention;

FIG. 3 is a sectional view of the chain operator taken along the plane of line 3—3 of FIG. 2;

FIG. 4 is a partially broken away side view of the chain operator hereof;

FIG. 5 is a to plan view of the chain operator with housing cover plate removed therefrom, taken along the plane of line 5—5 of FIG. 4;

FIG. 6 is a top plan view of the inner side of the housing cover plate portion of the chain operator;

FIG. 7A is partially broken away sectional view of a chain operator having a prior art guide arrangement as would be taken along the plane of line 3—3 of FIG. 2;

FIG. 7B is a partially broken away side plan view of a chain operator having a prior art guide arrangement, as would be taken along the plane of line 4—4 of FIG. 2; and FIG. 8 is a side sectional view of the chain operator having a guide arrangement of the present invention taken along the plane of line 3—3 of FIG. 2.

DETAILED DESCRIPTION OF THE PREFERRED EMBODIMENT

It is now in order to describe in a best mode embodiment, the details of the chain operator 20 of the present invention.

In the context of the preferred embodiment, FIG. 1 shows the chain operator 21 of the present invention installed within a conventional skylight window assembly 22 comprising a swinging window unit 23 pivotably connected to a liner 24, to which the chain operator 20 is mounted. In such an embodiment, the load of the swinging window unit 23 transmitted to the drive mechanism within the chain operator 20 via chain assembly 1, can be and usually is substantial.

Accordingly, the chain operator 20 preferably should be of the type capable of (i) maintaining substantial structural rigidity and rectilinearity when in its extended configuration, and (ii) simultaneously providing a sufficient degree of lateral flexure. In addition to providing load support, these chain features enable the chain assembly 1 to conform to the arcuate traverse of the swinging window unit 23 from the liner 24 of the skylight assembly 22, in which the chain operator 20 of the present invention is mounted.

Referring to FIGS. 1, 2 and 4 in particular, the chain operator 20 of the present invention includes a chain assembly 1 comprising a plurality of links 2 and rivets 3 connecting the links, where each rivet has a head 4. The chain operator 20 also includes a casing 5 comprising a housing 5A and a housing cover plate 5B, which (shown partially cut-away in FIG. 1) is mountable to the back of the housing 5A. The housing 5A is adapted to receive the mount an actuator 25, which while in the preferred embodiment is a hand operated crank mechanism 26 employing a conventional worm meshing gear, can also be an electric motor driven unit both well known in the art. The housing also includes two spaced-apart chain exit openings, termed herein as first chain exit opening 6A and second chain exit opening 6B. For purposes of notation hereinafter, the first chain exit opening 6A is designated as the exit through which chain length 1 extends towards the swinging window unit 23. Extending from the first chain exit opening 6A to the second chain exit opening 6B is a chain guide track, the outline of which is indicated by outer wall 27 in FIGS. 2 and 5.

Mounted in a conventional manner on a centrally located projecting shaft, within the housing 5A, is a drive sprocket 7 which is engagable with the chain assembly 1. The drive sprocket 7 has a center 8, a planar surface 9, and a plurality of sprocket teeth 10 disposed in the plane of the planar surface 9. The housing cover plate 5B (shown partially cut-away) is mountable to the back of the casing by a screw which inserts into a threaded hole 12 that is longitudinally formed inside the centrally located projecting shaft.

Referring to FIG. 5, the chain operator 20 is shown without the chain assembly 1 engaged with the drive sprocket 7. Adjacent first and second chain exit openings 6A and 6B respectively, are first and second upper guide arrangements 13A and 14B which are integrally formed with the inside surface of the housing 5A. In the preferred embodiment, each first and second upper and lower link guide arrangements 13A, 13B, and 14A, 14B respectively, comprises an inner and outer guide projection 15 and 16 which are parallely spaced apart by a distance of about 0.200 of an inch being slightly greater than the diameter of the rivet heads, whereas the height of each guide projection is approximately 0.090 of an inch. In different embodiments of the present invention, it is expected that such dimensions will be different. In the preferred embodiment, the distance or spacing 28 between the spaced guide projections 15 and 16 constituting a groove, is sufficient to provide clearance for the rivet heads to slide freely therebetween, whereby a rivet head accommodation means is formed.

In addition to providing the rivet head accommodation means, the guide arrangements of the present invention include additional features providing several specific advantages over prior guide arrangement designs. Referring to FIG. 8 in particular, the length of the first and second guide projections 15 and 16, designated hereinafter as $L_2$ is greater than the distance $L_1$, the distance between the ends of two spaced links 29 and 30 which are pivotally connected by an intermediate joining link 31. It has been discovered that an ensuring that the ratio $L_2/L_1$ is greater than unity, prevention of chain link edges digging into the guide projection surfaces can be achieved, as well as noise produced therefrom substantially eliminated.

Also as indicated in FIG. 4, in order to guide the rivet heads 4 of the chain 1 towards the rivet head accommodations means of the guide arrangement 13A, the chain exit opening 6A is provided with a narrow opening of dimensions slightly greater than the height of the chain links 2 illustrated in FIG. 2. Hereinafter $L_3$ is designated as the width of the aperture of the chain exit opening 6A, and $L_4$ is the height of the chain link 2. It has been discovered that provided $L_3/L_4$ is nearly unity, then the chain 1 will be properly guided towards the rivet head accommodation means of the guide arrangements 13A and 13B hereof.

The guide arrangements of the present invention further includes a planar guide shoulder 32 illustrated in FIG. 5. The planar guide shoulder 32 is disposed adjacent the chain exit opening 6A nearest the drive sprocket 7, which in the preferred embodiment, is towards the window unit 23 where loading on chain 1 is maximum. The planar guide shoulder 32 is also aligned with the boundary edges of the narrow chain exit opening 6A and parallel with the guide projections 15 and 16. Notably, the narrow chain exit opening 6A, the guide projections 15 and 16, and planar guide shoulder 32 cooperate to guide the chain links towards the guide arrangement so that the rivet heads 4 are guided in the rivet head accommodation means (e.g., channel between guide projections 15 and 16). The narrow chain exit opening 6A, guide projections 15 and 16, and planar guide shoulder 32 also cooperate to maintain the chain links 2 substantially in the plane of the planar surface 9 of the drive sprocket 7 as the chain length 1 moves through the casing 5 into engagement with the sprocket teeth 10. By such cooperation, jamming of sprocket teeth 10 into the chain links is avoided and desirable noise producing engagement of chain with portion of the casing 5 is minimized.

Referring now to FIG. 6, there is shown the housing cover plate 5B which has integrally formed therewith a first ring-like projection 17 of radius $r_1$, and a second ring-like projection 19 of radius $r_2$, each of which function as a stabilizer means of the present invention. Notably, to provide increased stabilization using the second ring-like projection, $r_2$ should be substantially less than $r_1$. Also formed integrally with the housing cover plate 5B are first and second lower guide arrangements 13B and 14B respectively, each of which comprise first and second guide projections 15 and 16 respectively, as described hereinbefore. Notably, the placement of the lower guide arrangements 13B and 14B on the housing cover plate is such that when the housing cover plate 5B is positioned on the housing 5A, the upper guide arrangements are aligned with lower guide arrangements, as indicated in FIGS. 3 and 4.

FIG. 3 shows a cross-sectional view of the chain operator 20 taken along the plane of line 3—3 illustrating the relieved nature of the guide projections 15 and 16 comprising upper and lower guide arrangements 13A and 13B (and 14A and 14B) of the present invention. As further illustrated in FIG. 5, each guide arrangement 13A and 13B (and 14A and 14B) comprises the pair of guide projections 15 and 16 the ends of which have slightly rounded edges 21 for the reasons discussed hereinbefore. In the preferred embodiment, the outer guide projection 16 is wider than the inner guide projection 15 as illustrated in FIGS. 3 and 4. This feature ensures that during chain travel through the chain operator, the flanges 18 of the chain links 2 are guided between the upper and lower guide arrangements 13A and 13B (and 14A and 14B), and that the engaging surfaces between the links 2 and guide projections are maintained in substantial surface-to-surface registration.

As illustrated in FIGS. 3 and 4, the lower guide arrangement 13B and upper guide arrangement 13A are disposed on opposite sides of the chain 1 and cooperate with each other as to guide and maintain the links substantially in the plane of the drive sprocket 7 when the housing cover plate 5B is positioned onto the housing 5A and as the length of chain 1 moves through the housing 5A in engagement with the sprocket teeth 10. This cooperative action of the upper and lower guide arrangements in addition to the guidance provided by the narrow aperture of the chain exit opening 6A and the rivet head accommodation means of the present invention, thereby avoids jamming of sprocket teeth 10 in the chain links 2 and eliminates noises such as clunking, chatter and the like.

When the housing cover plate 5B is positioned on the housing 5A, as shown in FIGS. 2, 3 and 4, the first ring-like projection 17 as well as the second ring-like projection 19 of the housing cover plate 5B become concentrically disposed with respect to the center 8 and bear against the planar surface 9 of the drive sprocket 7 at a radius $r_1$ from the center 8. As a result of this engaging relationship between the stabilizer means (i.e., ring-like projections 17 and 19) and planar surface 9 of drive sprocket 10, the drive sprocket 7 is maintained from substantial wobbling when engaged by actuator 25 and thereby prevents misalignment between the sprocket teeth 10 and the chain links 2 during operation. Thus, regardless of the severity of the load of the swinging window unit 23 which is transmitted to the drive sprocket 7 by way of chain assembly 1 during an operation cycle of the chain operator 20, the stabilizer means hereof obviates the above-described problem.

Alternatively, the stabilizer means of the present invention can be disposed on the drive sprocket 7 itself instead of the housing cover plate 5B, and thereby provide excellent results as well. The features of this embodiment are illustrated in FIG. 5 wherein first and second ring-like projections 17 and 19, respectively, are disposed on the surface 9 of the drive sprocket 7. In such instances, the housing cover plate 5B is preferably provided with a planar surface in the area of engagement opposite the planar surface 9 of the drive sprocket 7. This ensures that the stabilizer means (i.e., first and second ring-like projections 17 and 19) bears against the engaged planar surface of the housing cover plate 5B when the housing cover plate 5B is positioned and secured onto the back of housing 5A.

It is appropriate at this juncture to now describe the operation of the chain operator 20 of the preferred embodiment during a single cycle of operation. With the swinging window unit 23 in its closed position on top of liner 24, the manually-operated crank mechanism 26 of the actuator 25 is rotated, which by a conventional gear mechanism (not shown), rotates the drive sprocket 7. During the rotation of the drive sprocket 7, the sprocket teeth 10 engage the chain 1 and move it along the chain guide track 27 pulling the chain 1 through the second chain exit opening 6B and pushing it out through the first chain exit opening 6A under the load of the swinging window unit 23. During the rotation of the drive sprocket 7, the first and second ring-like projections 17 and 19 bear against the planar surface 9 of the drive sprocket 7 and maintain the same 7 from substantial wobbling and/or precession, thereby preventing misalignment between the sprocket teeth 10 and the chain links 2.

Also during the rotation of the chain operator 20, rivet head accommodation means hereof provides a channel 28 for the rivet heads 4 to slide therewithin, and the planar surface of the guide projections 15 and 16 of length $L_2$ prevents the chain links 2 from digging into the surface thereof. Also, the upper and lower guide arrangements 13A and 13B (and 14A and 14B) cooperate with each other on opposite sides of the chain 1 to guide the chain links 2 (by maintaining them substantially in the plane 9 of the drive sprocket 7) as the chain links 2 move through the casing 5 and into engagement with the sprocket teeth 10, to thereby avoid jamming of the sprocket teeth 10 with the chain links 2.

Upon reaching the open-position of the skylight window assembly 22, the direction of rotation of the crank mechanism 26 can be reversed to drive the sprocket 7 in the reverse direction thereby moving the chain 1 in a direction opposite to that hereinbefore described. During this part of the operation cycle, the stabilizer means (i.e., ring-like projections 17 and 19) and guide arrangements 13A and 13B (and 14A and 14B) function similarly as during opening the skylight window assembly 1. However, during this part of the operation cycle, the narrow aperture of the chain exit opening 6A, guide projections 15 and 16, and planar guide shoulder 32 cooperate with each other to maintain the chain links 2 substantially in the plane of the planar surface 9 of the drive sprocket 7 as the chain 1 moves through the casing 5 into engagement with the sprocket teeth. Such cooperation between the narrow chain exit opening 6A, planar guide shoulder 32, and guide projections 15 and 16 operates to guide the rivet heads 4 towards the rivet head accommodation means, whereafter the engaging surfaces of the chain links 2 and guide projections 15 and 16 are maintained in substantial surface-to-surface registration, further preventing the digging of chain links 2 into the guide projections 15 and 16 and thereby eliminating the noise produced therefrom by minimizing undesirable noise producing engagement of chain 1 with portions of the casing 5.

While the particular embodiment shown and described above has proven to be useful in many appliations, further modifications of the present invention herein disclosed will occur to persons skilled in the art to which the present invention pertains, and all such modifications are deemed to be within the scope and spirit of the present invention defined by the appended claims.

What is claimed is:

1. A chain operator for a window which comprises:
   a chain formed of a plurality of interconnected chain links and rivets having rivet heads formed thereon;
   a casing having spaced first and second chain exit openings;
   a chain guide track in said casing extending between said first and second chain exit openings and positioned to guide said chain between said chain exit openings;
   a drive sprocket rotatably mounted in said casing and having a plurality of sprocket teeth engagable with said chain to drive said chain between said chain exit openings when said drive sprocket is rotated, said drive sprocket further having a planar surface;
   a guide arrangement positioned in said casing adjacent one of said chain exit openings to guide said chain links near said chain exit opening and to maintain said chain links substantially in the plane of said planar surface of said drive sprocket as said chain links move through said casing into engagement with said sprocket teeth to thereby avoid jamming of sprocket teeth in said chain links and minimize undesirable noise producing engagement of chain with portions of said casing; and
   an actuator on said casing and connected to said drive sprocket and positioned to be engaged and rotated to operate said drive sprocket and drive said chain.

2. The chain operator of claim 1, wherein said guide arrangement further includes at least one head accommodation means for accommodating said rivet heads disposed on one side of said chain.

3. The chain operator of claim 1 wherein said drive sprocket has a center and a planar surface, said plurality of sprocket teeth disposed substantially in the plane of said planar surface.

4. The chain operator of claim 3 wherein said casing comprises:
   a housing for mounting said drive sprocket and having said spaced first and second chain exit openings, and
   a housing cover plate mountable onto the back to said housing, and wherein said guide arrangement includes
   an upper guide arrangement disposed inside said housing adjacent one of said chain exit openings, and
   a lower guide arrangement disposed on said housing cover plate and cooperating with said upper guide arrangement as to guide said chain links near said chain exit opening and maintain said chain links substantially in the plane of said planar surface of said drive sprocket when said housing cover plate is positioned onto said housing and as said chain length moves through said casing into engagement with said sprocket teeth, to thereby avoid jamming of sprocket into said chain links.

5. The chain operator of claim 4 wherein said lower guide arrangement is integrally formed with said housing cover plate and said upper guide arrangement is integrally formed with said housing.

6. The chain operator of claim 4 wherein said upper and lower guide arrangements each comprises:
   a first guide projection and a second guide projection, said guide projections parallely disposed a distance apart sufficient to provide a channel for said rivet heads of said chain to slide therewithin whereby said rivet head accommodation means is formed.

7. The window operator of claim 1 wherein said window operator is installed on a skylight window assembly including a swinging window, and wherein one end of said chain adjacent said first chain exit opening is connected to said swinging window unit.

8. The window operator of claim 1 wherein said guide arrangement is positioned in said casing adjacent said first chain exit opening.

9. The chain operator of claim 1 which further comprises a stabilizing means in said casing in position to engage and maintain said drive sprocket from substantial wobbling during rotation and thereby preventing misalignment between said sprocket teeth and said chain links.

10. The chain operator of claim 1 wherein said actuator is a manually operable crank mechanism.

11. The chain operator of claim 1 wherein said actuator is an electric motor driven unit.

12. A chain operator for a window which comprises:
   a chain formed of a plurality of interconnected chain links and rivets having rivet heads formed thereon;
   a casing having spaced first and second chain exit openings;
   a chain guide track in said casing extending between said first and second chain exit openings and positioned to guide said chain between said chain exit openings;
   a drive sprocket rotatably mounted in said casing and having a plurality of sprocket teeth engagable with said chain to drive said chain between said chain exit openings when said drive sprocket is rotated;
   a guide arrangement positioned in said casing adjacent one of said chain exit openings to guide said chain links as said chain links move through said casing into engagement with said sprocket teeth to thereby avoid jamming of sprocket teeth in said chain links and minimize undesirable noise producing engagement of chain with portions of said casing; and
   an actuator on said casing and connected to said drive sprocket and positioned to be engaged and rotated to operate said drive sprocket and drive said chain, said drive sprocket having a center and a planar surface, said plurality of sprocket teeth disposed substantially in the plane of said planar surface, said casing including
   a housing for mounting said drive sprocket and having said spaced first and second chain exit openings, and
   a housing cover plate mountable onto the back of said housing, and wherein said guide arrangement includes
   an upper guide arrangement disposed inside said housing adjacent one of said chain exit openings, and
   a lower guide arrangement disposed on said housing cover plate and cooperating with said upper guide arrangement as to guide said chain links near said chain exit openings and maintain said chain links subsequentially in the plane of said planar surface of said drive sprocket when said housing cover plate is positioned onto said housing and as said chain length moves through said casing into engagement with said sprocket teeth, to thereby avoid jamming of sprocket into said chain links, said upper and lower guide arrangements each including, a first guide projection and a second guide projection, said guide projections parallely disposed a distance apart sufficient to provide a channel for said rivet heads of said chain to slide therewithin whereby said rivet head accommodation means is formed, the ends of said guide projections having slightly rounded edges at the engagement surfaces with said chain so that said chain links can slide thereover without substantial resistance.

13. A chain operator for a window which comprises:
a chain formed of a plurality of interconnected chain links and rivets having rivet heads formed thereon;
a casing having spaced first and second chain exit openings;
a chain guide track in said casing extending between said first and second chain exit openings and positioned to guide said chain between said chain exit openings;
a drive sprocket rotatably mounted in said casing and having a plurality of sprocket teeth engagable with said chain to drive said chain between said chain exit openings when said drive sprocket is rotated;
a guide arrangement positioned in said casing adjacent one of said chain exit openings to guide said chain links as said chain links move through said casing into engagement with said sprocket teeth to thereby avoid jamming of sprocket teeth in said chain links and minimize undesirable noise producing engagement of chain with portions of said casing; and
an actuator on said casing and connected to said drive sprocket and positioned to be engaged and rotated to operate said drive sprocket and drive said chain, said drive sprocket has a center and a planar surface, said plurality of sprocket teeth disposed substantially in the plane of said planar surface, said casing including
a housing for mounting said drive sprocket and having said spaced first and second chain exit openings, and
a housing cover plate mountable onto the back of said housing, and wherein said guide arrangement includes
an upper guide arrangement disposed inside said housing adjacent one of said chain exit openings, and
a lower guide arrangement disposed on said housing cover plate and cooperating with said upper guide arrangement as to guide said chain links near said chain exit openings and maintain said chain links substantially in the plane of said planar surface of said drive sprocket when said housing cover plate is positioned onto said housing and as said chain length moves through said casing into engagement with said sprocket teeth, to thereby avoid jamming of sprocket into said chain links, said upper and lower guide arrangements each including a first guide projection and a second guide projection, said guide projections parallely disposed a distance apart sufficient to provide a channel for said rivet heads of said chain to slide therewithin whereby said rivet head accommodation means is formed, said chain exit opening adjacent said guide arrangement is provided with a narrow opening for guiding said chain links towards said guide arrangement so that said rivet heads are guided in said rivet head accommodating means.

14. The chain operator of claim 13 wherein said guide arrangement further includes a planar guide shoulder disposed adjacent the chain exit opening nearest said drive sprocket and aligned with the boundary edges of said narrow opening and parallel with said guide projections, whereby said shoulder cooperates with said guide projections and said narrow opening to guide said chain links towards said guide arrangement so that said rivet heads are guided in said rivet head accommodation means, and to further maintain said chain links substantially in the plane of said planar surface of said drive sprocket as chain length moves through said casing into engagement with said sprocket teeth, to thereby avoid jamming of sprocket teeth into said chain links and to minimize undesirable noise producing engagement of said chain with portions of said casing.

15. The chain operator of claim 14 wherein the length of said first and second guide projections is greater than the distance between the ends of two spaced links of said chain pivotally connected by an intermediate joining link, to prevent said chain links from digging into said guide projections and thereby eliminate noise produced therefrom.

16. A window operator for a window which comprises:
a chain formed of interconnected chain links and rivets having rivet heads formed thereon;
a casing having spaced first and second chain exit openings;
a chain guide track in said casing extending between said first and second chain exit openings and positioned to guide said chain between said chain exit openings;
a drive sprocket rotatably mounted in said casing and having a plurality of sprocket teeth engagable with said chain to drive said chain between said chain exit openings when said drive sprocket is rotated;
a guide arrangement positioned in said casing adjacent one of said chain exit openings to guide said chain links as said chain links move through said casing into engagement with said sprocket teeth to thereby avoid jamming of sprocket teeth in said chain links and minimize undesirable noise producing engagement of chain with portions of said casing; and
an actuator on said casing and connected to said drive sprocket and positioned to be engaged and rotated to operate said drive sprocket and drive said chain, said drive sprocket has a center and a planar surface, said plurality of sprocket teeth disposed substantially in the plane of said planar surface, said casing including
a housing for mounting said drive sprocket and having said spaced first and second chain exit openings, and
a housing cover plate mountable onto the back of said housing, and wherein said guide arrangement includes
an upper guide arrangement disposed inside said housing adjacent one of said chain exit openings, and a lower guide arrangement disposed on said housing cover plate and cooperating with said upper guide arrangement as to guide said chain links near said chain exit opening and maintain said chain links substantially in the plane of said planar surface of said drive sprocket when said housing cover plate is positioned onto said housing and as said chain length moves through said casing into engagement with said sprocket teeth, to thereby avoid jamming of sprocket into said chain links,
said upper and lower guide arrangements each including
a first guide projection and a second guide projection, said guide projections parallely disposed a distance apart sufficient to provide a channel for said rivet heads of said chain to slide therewithin whereby said rivet head accommodation means is formed,
said first guide projection is wider than said second guide projection so that the engaging surfaces of said chain links and said guide projections are maintained in substantial surface-to-surface registration.

17. A chain operator for a window, which comprises:
a chain formed of a plurality of interconnected chain links;
a casing having spaced first and second chain exit openings;
a chain guide track in said casing extending between said first and second chain exit openings and positioned to guide said chain between said chain exit openings;
a drive sprocket rotatably mounted in said casing and having a plurality of sprocket teeth engagable in said chain to drive said chain between said chain exit openings when said drive sprocket is rotated;
a stabilizing means in said casing in position to engage and maintain said drive sprocket from substantial wobbling during rotation and thereby preventing misalignment between said sprocket teeth and said chain links; and
an actuator on said casing and connected to said drive sprocket and positioned to be engaged and rotated to operate said drive sprocket and drive said chain.

18. The chain operator of claim 17 wherein said actuator is a manually operable crank mechanism.

19. The chain operator of claim 17 wherein said actuator is an electric motor drive unit.

20. The chain operator of claim 17 wherein said drive sprocket has a center and a planar surface, said plurality of sprocket teeth being disposed substantially in the plane of said planar surface.

21. The chain operator of claim 20 wherein said casing comprises:
a housing for mounting said drive sprocket and having said first and second chain exit openings, and
a housing cover plate mountable onto the back of said housing and having a substantially planar surface in area opposite said planar surface of said drive sprocket.

22. The chain operator of claim 20 wherein said casing comprises:
a housing for mounting said drive sprocket and having said spaced first and second chain exit openings, and
a housing cover plate mountable onto the back of said housing.

23. The chain operator of claim 22 wherein said stabilizing means is formed on said housing cover plate and bearing against said planar surface of said drive sprocket when said housing cover plate is positioned onto said casing to thereby prevent wobbling of said drive sprocket when engaged by said actuator.

24. A chain operator for a window, which comprises:
a chain formed of a plurality of interconnected chain links;
a casing having spaced first and second chain exit openings;
a chain guide track in said casing extending between said first and second chain exit openings and positioned to guide said chain between said chain exit openings;
a drive sprocket rotatably mounted in said casing and having a plurality of sprocket teeth engagable in said chain to drive said chain between said chain exit openings when said drive sprocket is rotated;
a stabilizing means in said casing in position to engage and maintain said drive sprocket from substantial wobbling during rotation and thereby preventing misalignment between said sprocket teeth and said chain links; and
an actuator on said casing and connected to said drive sprocket and positioned to be engaged and rotated to operate said drive sprocket and drive said chain,
said drive sprocket having a center and a planar surface, said plurality of sprocket teeth disposed substantially in the plane of said planar surface, said casing including
a housing for mounting said drive sprocket and having said spaced first and second chain exit openings, and
a housing cover plate mountable onto the back of said housing, said stabilizing means being formed on said housing cover plate and bearing against said planar surface of said drive sprocket when said housing cover plate is positioned onto said casing to thereby prevent wobbling of said drive sprocket when engaged by said actuator,
said stabilizer means including a ring-like projection concentric with said center and bearing against said planar surface of said drive sprocket at a radius $r_1$ from said center when said housing cover plate is positioned onto said housing.

25. The chain operator of claim 24 wherein said stabilizing means further comprises a second ring-like projection integrally formed on said housing cover plate, concentric with said center and bearing against said planar surface of said drive sprocket at a radius $r_2$ from said center when said housing cover plate is positioned onto said housing, said radius $r_2$ being substantially less than $r_1$.

26. A chain operator for a window, which comprises:
a chain formed of a plurality of interconnected chain links;
a casing having spaced first and second chain exit openings;
a chain guide track in said casing extending between said first and second chain exit openings and positioned to guide said chain between said chain exit openings;
a drive sprocket rotatably mounted in said casing and having a plurality of sprocket teeth engagable in said chain to drive said chain between said chain exit openings when said drive sprocket is rotated;
a stabilizing means in said casing in position to engage and maintain said drive sprocket from substantial wobbling during rotation and thereby preventing misalignment between said sprocket teeth and said chain links; and an actuator on said casing and connected to said drive sprocket and positioned to be engaged and rotated to operate said drive sprocket and drive said chain, said drive sprocket having a center and a planar surface, said plurality of sprocket teeth disposed substantially in the plane of said planar surface, said casing further including a housing for mounting said drive sprocket and having said first and second chain exit openings, and a housing cover plate mountable onto the back of said housing and having a substantially planar surface in area opposite said planar surface of said drive sprocket, said stabilizing means including a first ring-like projection formed on said drive sprocket and concentric with said center thereof, and bearing against said planar surface of said housing cover plate at a radius r, from said center when said housing cover plate is positioned into said housing.

27. The chain operator of claim 26 wherein said stabilizing means further comprises a second ring-like projection integrally formed on said drive sprocket and concentric with said center and bearing against said planar surface of said housing cover plate at a radius $r_2$ from said center when said housing cover plate is positioned onto said housing, said radius $r_2$ being substantially less than $r_1$.

* * * * *